United States Patent [19]
Fury

[11] Patent Number: 5,908,183
[45] Date of Patent: Jun. 1, 1999

[54] PRECISION POWER COUPLING HOUSING

[76] Inventor: Robert Fury, P.O. Box 582, Chester, N.Y. 10918

[21] Appl. No.: 08/898,430

[22] Filed: Jul. 22, 1997

[51] Int. Cl.$^6$ ..................................................... E04G 3/00
[52] U.S. Cl. ....................................... 248/274.1; 464/106
[58] Field of Search ................................ 248/274.1, 674, 248/558; 403/12, 26, 73, 341, 374.4, 408.1; 464/99, 106, 162; 269/37, 43, 98, 111

[56] References Cited

U.S. PATENT DOCUMENTS

| 545,353 | 8/1895 | Fenner | 464/106 |
|---|---|---|---|
| 1,765,321 | 6/1930 | Bodmer | 269/98 |
| 1,872,580 | 8/1932 | Harness et al. | 248/674 |
| 1,920,877 | 8/1933 | Bert'odatto | 464/99 |
| 2,676,504 | 4/1954 | Brugge et al. | 269/37 |
| 3,512,375 | 5/1970 | Madarasz et al. | 464/106 |
| 4,138,079 | 2/1979 | Ehert et al. | 248/558 |
| 4,566,865 | 1/1986 | Nishitsuji et al. | 248/674 |
| 4,601,378 | 7/1986 | Pierce et al. | 248/674 |
| 4,718,471 | 1/1988 | Kraeutler | 160/84.02 |
| 5,364,062 | 11/1994 | Doyle, Jr. et al. | 248/674 |

Primary Examiner—Leslie A. Braun
Assistant Examiner—Robert Lipcsik
Attorney, Agent, or Firm—Terrance L. Siemens

[57] ABSTRACT

The present device features a precision power coupling housing formed from a U-shaped, extruded aluminum channel. An input power source such as a motor is mounted to a first leg portion of the U-shaped channel while a load device to mounted to the second leg portion of the channel. The motor's output shaft and the load's input shaft meet in the interior region of the channel facilitating the use of a vibration damping coupling or the like between the two shafts. Bolts passing through the two leg portions of the channel and perpendicular to the two leg portions are provided to slightly adjust the parallelism of the two leg portion so as to allow precision alignment of the input and output shafts.

4 Claims, 3 Drawing Sheets

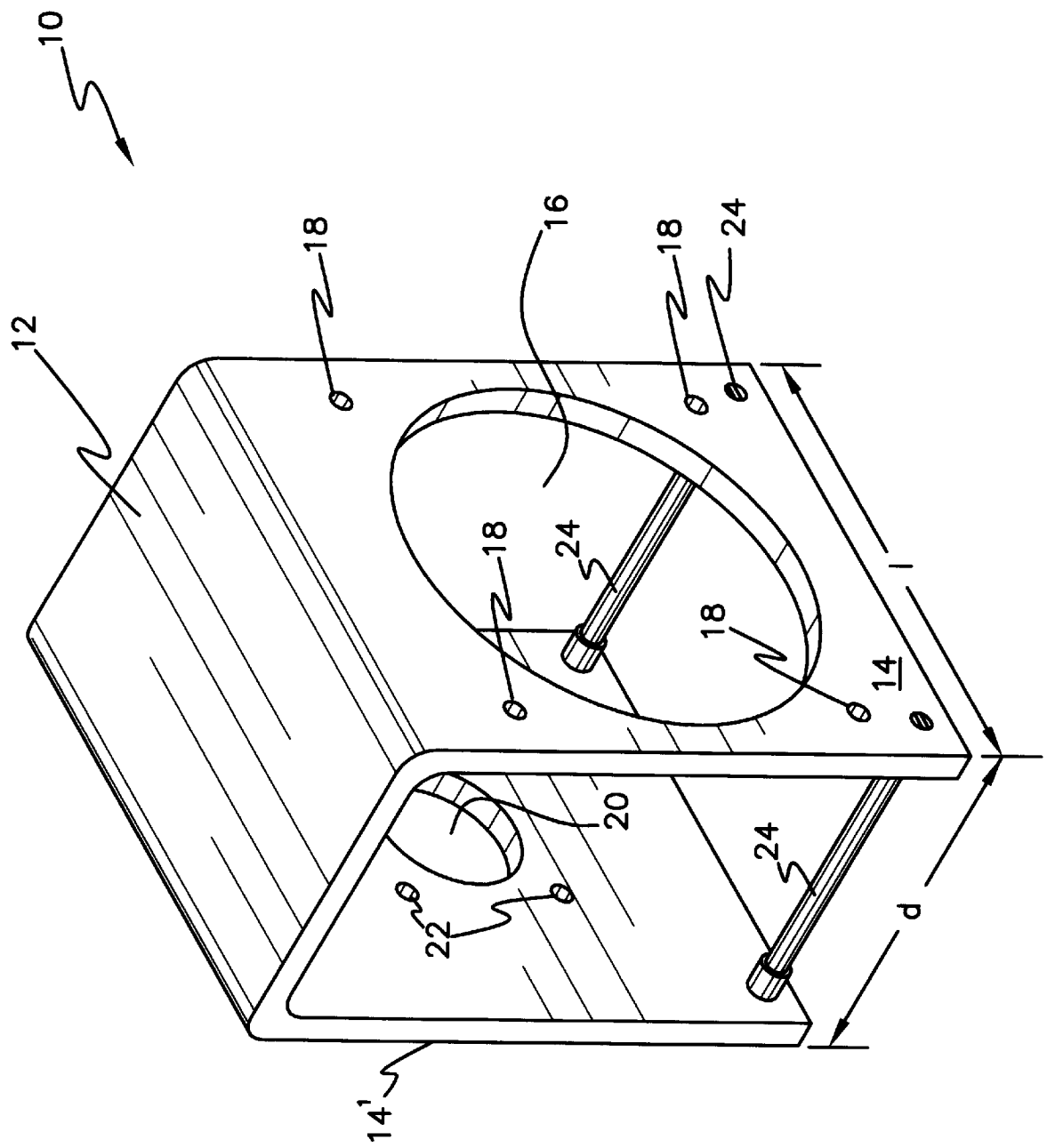

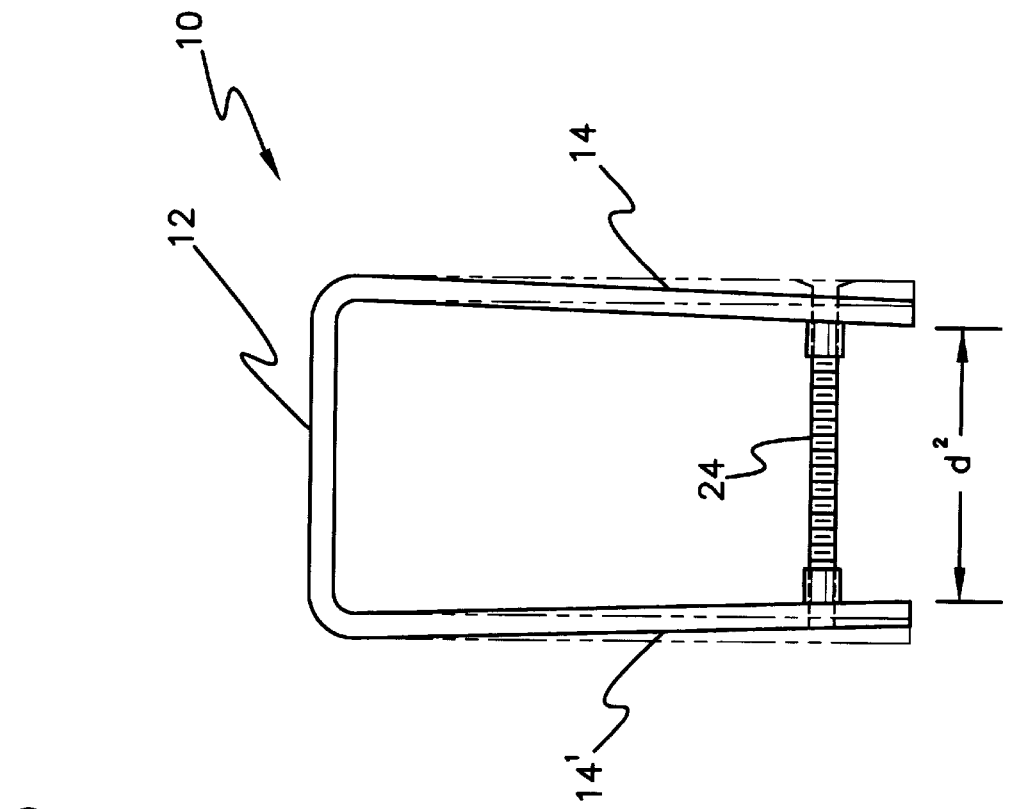
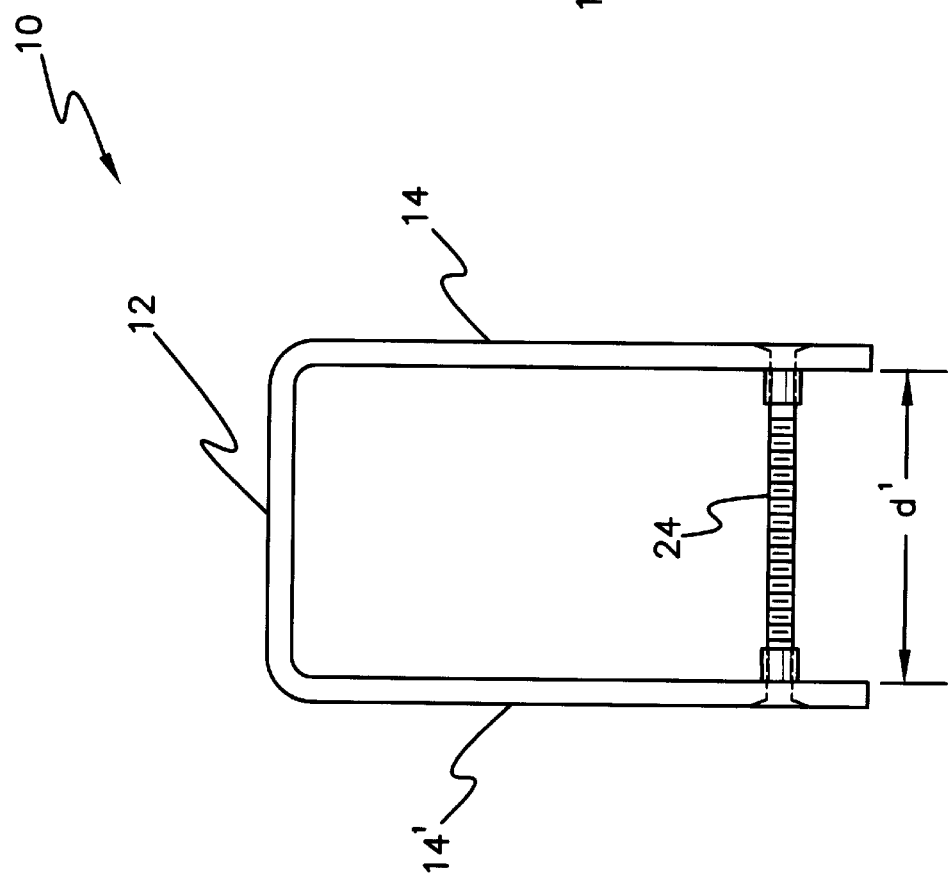

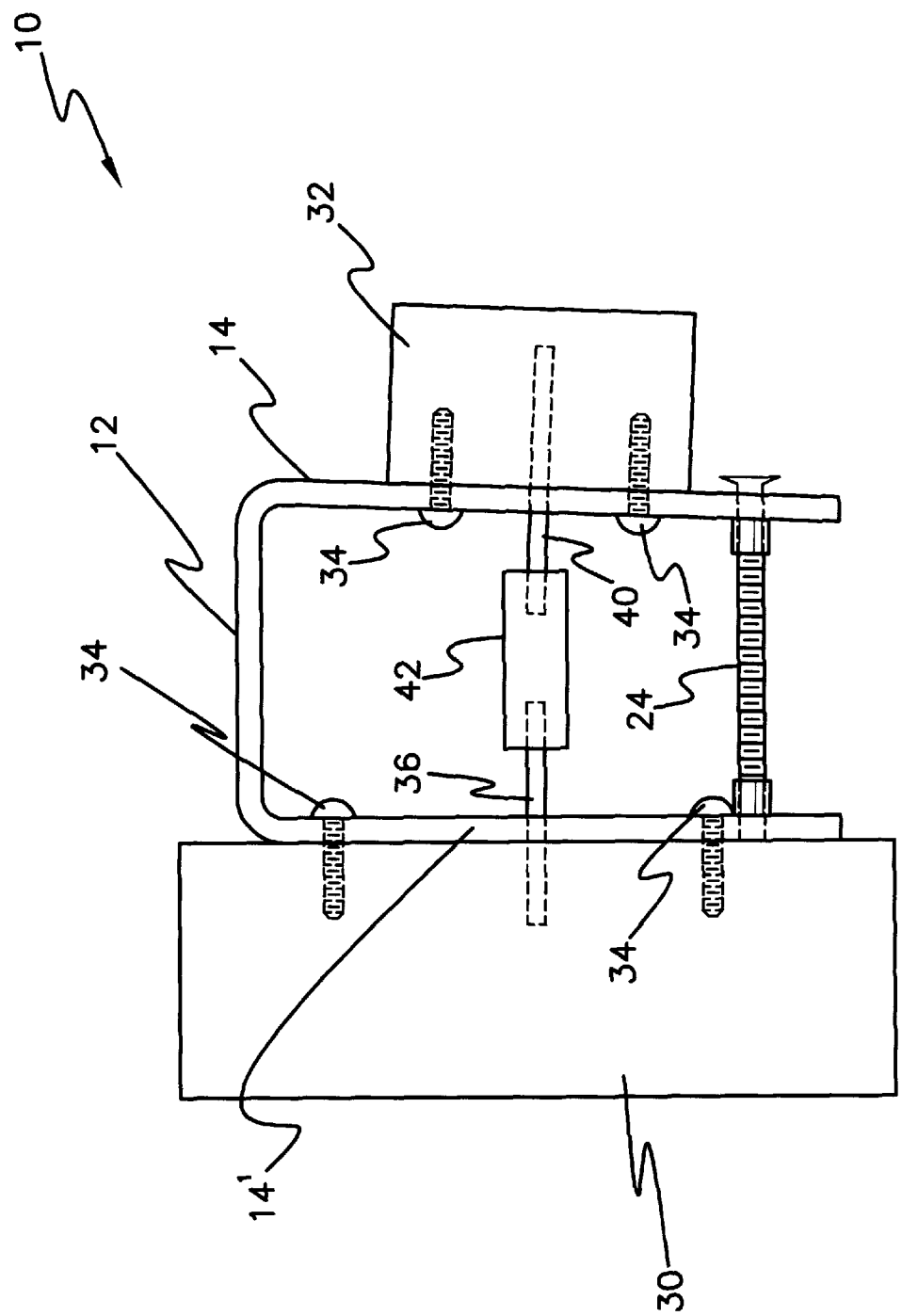

PRECISION POWER COUPLING HOUSING

FIELD OF THE INVENTION

The present invention relates to a power coupling apparatus and, more particularly, to a precision, adjustable power coupler housing designed to couple a rotating prime mover to a driven load.

BACKGROUND OF THE INVENTION

Whenever a rotating power source such as a motor, engine or an intermediate device such as a clutch, transmission or gear box must provide energy to a power-consuming load, there exists the problem of matching and aligning the shafts of the power source to the power consuming load. For purposes of discussion any power source or power load will be referred to as a power device hereinbelow. One way in which power is transmitted from a power source to a load is by rotating shafts arranged end-to-end in a coupled relationship. These shafts are generally retained in bearings which allows essentially friction-free rotation of the shafts. Most bearings are easily damaged if subjected to any side-to-side pressure or stress. Such stress may arise if the two coupled shafts are not in perfect alignment (i.e., the two shafts are not coplanar as well as coaxial). In addition to excessive bearing wear or, in extreme cases, destruction of the bearings, unaligned operation generally results in chatter or vibration which may effect the functionality of the apparatus of which the motor/coupling/load subsystem forms a part. Even if vibration or chatter does not degrade system performance, it is annoying and may cause the apparatus to seem subjectively inferior to a quieter competitive product. In an ideal power coupling housing it is important that means be provided to compensate for small variations in power devices, shafts, coupler or in the housing structure itself, any of which may cause misalignment.

In addition, the coupler must sometimes also provide support to one or more power devices which necessitates a sturdy, reasonably rigid design.

DISCUSSION OF THE PRIOR ART

U.S. Pat. No. 4,601,378 for SUPPORTING BRACKET FOR HYDRAULIC PUMP AND CLUTCH; issued Jul. 22, 1986 to William C. Pierce, et al. illustrates one approach to the problem of coupling. The Pierce et al. device comprises an L-shaped bracket adapted to receive on one side the end flange of a hydraulic motor. On the other side, the bracket is fashioned to receive the stationery portion of an electromagnetic clutch. The Pierce, et all housing is a machined casting with no provision for adjusting the alignment of the hydraulic motor with respect to the clutch assembly. Also, in the Pierce, et al. apparatus, the close proximity of the hydraulic motor to the clutch precludes the insertion of any hydraulic motor to the clutch precludes the insertion of any vibration damping component such as a flexible shaft section between the devices. In contradistinction, the precision power coupling housing of the instant invention is formed from a U-shaped extrusion. This provides several advantages over the Pierce, et al. approach including a low manufacturing cost and spacial isolation of the power input and load devices. The U-shaped housing allows for adjusting the alignment of the input and output devices by slightly altering the parallelism of the two legs of the U-channel by means of one or more tie bolts.

U.S. Pat. No. 4,138,079 for MOTOR SUPPORTING PLATFORM; issued Feb. 6, 1979 to Gordon F. Ehert, et al. discloses a unitary base structure adapted to receive the body of a motor. An adjustable cradle at a distal end of the base allows for a vertical adjustment of the motor's output shaft position. Unlike the inventive precision power coupling housing, there is no provision to mount the load device to the base. Also, unlike the inventive coupling housing, no lateral alignment adjustment is possible. There is no U-shaped structure taught or suggested by Ehert, et al.

Another approach to the mounting and coupling of a prime mover to a load is taught in U.S. Pat. No. 5,364,062 for MOUNTING APPARATUS FOR A RAILROAD AIR BRAKE CYLINDER; issued Nov. 15, 1994 to James J Doyle, Jr. et al. The Doyle et al. apparatus comprises an intermediate plate assembly designed to facilitate the mounting of a railroad air brake cylinder to a bolster casting by a single workman. While the Doyle et al. plate is adapted to receive the end flange of an air brake cylinder, no adjustment of alignment of the actuating rod is possible. Unlike the inventive housing, no U-shaped section is employed by Doyle, nor is there any room between and input side and an output side of the plate for interposing a vibration-damping coupling or the like.

Finally, U.S. Pat. No. 4,566,865 for CLOSED TYPE COMPRESSOR; issued Jan. 28, 1986 to Kazuichi Nishitsuji, et al. features a mounting frame adapted for mounting both a motor and a compressor. While a U-shape section is present in the Nishitsuji, et al. apparatus, it is formed from sheet metal not, as is the case with the inventive housing, from a U-shaped extrusion. No adjustability is possible to control alignment of the motor to the compressor. Also, in the Nishitsuji, et al. arrangement, the motor is mounted atop the base portion of the inverted U-shaped section while the compressor is suspended beneath the section. In the inventive housing, the power source and the load are mounted oppositly on the two leg portions of the U-section thereby allowing alignment of the power source and load by altering the parallelism of the two leg sections.

It is therefor an object of the invention to provide a U-shaped, precision power coupling housing which is inexpensive to manufacture from a preformed, U-shaped aluminum extrusion.

It is another object of the invention to provide a precision power coupling housing in which a power device may be mounted to a first leg section of a U-shaped extrusion and a second power device may be mounted to a second leg section of the U-shaped extrusion.

It is a further object of the invention to provide space between the output shaft of the power source and the input shaft of the load whereby a vibration damping coupling or the like may readily be inserted between the two shafts at an interior region of the U-shaped precision power coupling housing.

It is yet another object of the invention to provide a means for selectively adjusting the alignment of the shafts of the power source and load by slightly altering the parallelism of the two leg sections of the U-shaped extrusion.

It is still another object of the invention to utilize the closed nature of the U-shaped extrusion to form a substantial portion of a guard enclosure to keep objects and/or people away from the inherently sensitive and/or dangerous rotating components.

SUMMARY OF THE INVENTION

The present invention features a precision power coupling housing formed from a U-shaped, extruded aluminum channel. An input power source such as a motor is mounted to a first leg portion of the U-shaped channel while a load device is mounted to the second leg portion of the channel. The motor's output shaft and the load's input shaft meet in the interior region of the channel facilitating the use of a vibration damping coupling or the like between the two shafts. Bolts passing through the two leg portions of the channel and perpendicular to the two leg portions are provided to slightly adjust the parallelism of the two leg portions allowing precision alignment of the input and output shafts.

BRIEF DESCRIPTION OF THE DRAWINGS

A complete understanding of the present invention may be obtained by reference to the accompanying drawings, when taken in conjunction with the detail description thereof and in which:

FIG. 1 is a perspective view of the precision power coupling housing;

FIG. 2a is an end view of the precision power coupling housing in a relaxed, non-compressed state;

FIG. 2b is an end view of the precision power coupling housing in a tightened, compressed state; and FIG. 3 is a schematic end view of the precision power coupling housing showing a pair of coupled power devices in place.

DESCRIPTION OF THE PREFERRED EMBODIMENT

Generally speaking this invention relates to a power coupling housing, and more particularly to a precision power coupling housing formed from a U-shaped, extruded channel. An input power source such as a motor is mounted to a first leg portion of the U-shaped channel while a load device is mounted to the second leg portion of the channel.

Referring first to FIG. 1, there is shown a perspective view of the precision power coupling housing generally at reference number 10. A length "l" has been cut from bulk extruded U-shaped aluminum channel stock. While an extruded aluminum channel has been chosen for purposes of disclosure, it should be obvious to those having skill in the art that any suitable, extrudable metal or polymer may be employed. The U-shaped section could also be molded from a ceramic or other similar material or machined from some other non-extrudable material if operating circumstances so warranted. Base 12 and leg portions 14, 14' together form the U-channel, shown inverted in FIG. 1. Leg portion 14 has been machined to receive either a motor (not shown) or a load device (not shown). Clearance hole 16 is sized as is required to receive a particular motor or load device. Likewise, mounting holes 18 in leg portion 14 are sized and spaced to accommodate a particular motor or load. It will be obvious to those of skill in the art that a virtually unlimited number of mounting arrangements are possible for attaching a motor or a load device to power coupling housing 10. In a similar manner, clearance hole 20 and mounting holes 22 are shown in leg portion 14'. Holes 20, 22 are also adapted and arranged to accommodate a particular power source or load and may also take on any number of patterns or arrangements as required for a particular operating circumstance. Bolts 24 are inserted through leg portions 14 and 14' proximate each end of housing 10. The tightening or loosening of one or both of bolts 24 will slightly alter the distance "d" between leg portion 14 and leg 14' thereby altering the parallelism of leg portions 14 and 14'. This alteration slightly affects the alignment of the shafts (not shown) of the power source (not shown) and the load (not shown).

Referring now to FIGS. 2a and 2b, there is shown an end view of housing 10. In FIG. 2a, bolt 24 is shown in an untightened state resulting in an essentially parallel relationship between leg portions 14 and 14' and a distance $d_1$ between leg portions 14 and 14'. In FIG. 2b, bolt 24 has been tightened drawing leg portions 14 and 14' together. Leg portions 14 and 14' are no longer parallel and the distance therebetween has been reduced to $d_2$. The depiction of the movement of leg portions 14 and 14' is exaggerated for purposes of illustration. It has been determined that relatively small movements of leg portions 14, 14' are required to precisely align the shafts (not shown) of a motor (not shown) and a load device (not shown).

Referring now to FIG. 3 there is shown a schematic end view of the precision power coupling housing 10 with a pair of power devices 30, 32 in place. Power device 30 is affixed to leg portion 14' of housing 10 by means of fasteners 34. Fasteners 34 may be machine screws or any other suitable fastener know to those of skill in the art. Power device 30 transmits or receives power by means of shaft 36 shown protruding through opening 20 in leg portion 14'. Power device 32 is shown affixed to leg portion 14 with fasteners 34. Power device 32 transmits or receives power by means of shaft 40. Shaft 36 and shaft 40 a coupled by shaft coupler 42. Shaft coupler 42 may be a rigid metal or polymer coupler of may be any of a number of styles or resilient coupler well known to those of skill in the art.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A power coupling housing comprising:
   a monolithic U-shaped channel having a base, a first leg portion and a second leg portion, where said first and second leg portions are generally parallel to one another, and where said first and second leg portions are generally perpendicular to said base and extend therefrom;
   each of said first and said second leg portions having a securing means thereon adapted to receive a corresponding power device; and
   at least one bolt extending between said first and said second leg portions and rotatably attached to both, said at least one bolt being tightened or loosened to vary the distance between said first leg portion and said second leg portion, said bolt being located distal from said base,
   whereby said bolt is tightened or loosened to adjust the relative angle between said first leg portion and said second leg portion so that a coupling device may be attached between the respective power devices.

2. The power coupling housing according to claim 1, wherein said monolithic U-shaped channel is made of aluminum.

3. The power coupling housing according to claim 1, wherein said monolithic U-shaped channel is extruded.

4. The power coupling housing according to claim 1, wherein the adaption of said first and second leg portions each to receive a power device comprises a plurality of mounting holes located on both of said first and second leg portions.

\* \* \* \* \*